United States Patent Office 3,245,972
Patented Apr. 12, 1966

3,245,972
POLYTETRAFLUOROETHYLENE MOLDING
POWDER AND ITS PREPARATION
Roland Fitzhugh Anderson, Vienna, W. Va., William Lee Edens, Marietta, Ohio, and Howland Aikens Larsen, Wilmington, Del., assignors to E. I. du Pont de Nemours and Company, Wilmington, Del., a corporation of Delaware
No Drawing. Filed June 21, 1962, Ser. No. 204,067
6 Claims. (Cl. 260—92.1)

The present invention relates to preparation of polytetrafluoroethylene powders having excellent moldability and to novel polytetrafluoroethylene molding powders having a unique combination of properties including excellent moldability and powder flow.

Polytetrafluoroethylene powders hitherto made available have been of two general kinds, i.e., polytetrafluoroethylene granular powders having a total surface area per gram in the range of 1 to 4, e.g., 1.1 to 2.8 square meters, obtained by procedures which comprise polymerizing tetrafluoroethylene in contact with an aqueous medium containing a free radical initiator to obtain a slurry of polymer particles, in non-water-wet form, as disclosed for example, in Brubaker U.S. Patent 2,393,967, issued February 5, 1946; and polytetrafluoroethylene fine powders having a total surface area per gram in the range of 9 to 12, e.g., 10 to 11 square meters, obtained by polymerizing tetrafluoroethylene in an aqueous medium containing a free radical initiator and a telogenically inactive dispersing agent to obtain an aqueous colloidal dispersion of polymer particles, and coagulating the dispersion, as disclosed, for example, in Berry U.S. Patent 2,559,752, issued July 10, 1951, and Lontz U.S. Patent 2,593,583, issued April 4, 1952. The fine powders have not been suitable for general molding, inasmuch as they tend to crack when preformed and free-sintered in attempts to make massive articles, and inasmuch as they exhibit poor powder flow properties, which renders them difficult to process in automatic molding machines. Although it has been found possible to minimize the cracking tendency of fine powders by special techniques, as disclosed for example, in Thomas U.S. Patent 3,010,950, issued November 28, 1961, these techniques further impair the flow properties of the powder. The granular powders on the other hand have usually manifested poor moldability properties, such that relatively high pressures have been required in pressing into preforms which will free-sinter to substantially void-free articles. Again, while it has been found possible by special techniques to improve the moldability of such powders, as disclosed for example in Thomas et al. U.S. Patent 2,936,301 issued May 10, 1960, these techniques also impair the flow properties of the powders, so as to make them difficult if not impossible to process on automatic molding machines. Further, while it has been found possible to effect limited improvement in the flow properties of polytetrafluoroethylene powders by special techniques, as disclosed for example in Cheney U.S. Patent 2,456,621, issued December 21, 1948, such treatments so impair the moldability of the powders that it has not been possible through their use to convert the highly moldable, poorly flowing powders hitherto made available into powders having a desirable combination of powder flow and moldability properties. Moreover in general the special procedures above described for the preparation of highly moldable powders have been considerably more expensive than the procedures required for preparing powders of ordinary moldability properties.

In accordance with the present invention there are provided novel procedures for preparing polytetrafluoroethylene molding powders which comprise polymerizing tetrafluoroethylene in contact with a stirred aqueous medium containing a free radical initiator and solid nuclei in the form of agglomerated non-water-wet particles having a total surface area per gram of greater than 3 square meters, characterized in that the medium contains at least $5 \times 10^{-10}$ nuclei per milliliter, polymerization is continued until the particles have a reduced total surface area per gram of less than 9 square meters, and polymerization is discontinued before the total surface area of the particles per gram falls below 3 square meters. The particles so obtained thus have a total surface area per gram of at least 3 and less than 9 square meters. As prepared they are irregular and stringy. However they may be water-cut and washed by simple procedures to yield powders having excellent moldability and powder flow. In certain preferred aspects of the invention there are obtained novel molding powders having a total surface area of at least 3 and less than 9 square meters per gram, a moldability index of less than 50 and an apparent (bulk) density, indicative of powder flow, of at least 400 g./liter.

The term "total surface area per gram," as used herein, refers to a value obtained by nitrogen adsorption, for example, by the procedure described by W. E. Barr and Victor J. Anhorn in Chapter XII of "Scientific and Industrial Glass Blowing and Laboratory Techniques," published in 1949 by Instruments Publishing Co., or other equivalent procedure.

The term "moldability index," as used herein, refers to the difference between the "standard specific gravity" (SSG) of the polytetrafluoroethylene, as determined by the procedure of A.S.T.M. D–1457–56T, and a modified standard specific gravity of a sample of the same powder determined in the same way as A.S.T.M. D–1457–56T, except that the powder is preformed at 2000 pounds per square inch pressure instead of the 5000 pounds per square inch pressure prescribed by the A.S.T.M. test, the difference between the two specific gravities being multiplied by 1000 to obtain the "moldability index."

The term "apparent bulk density," as used herein, is also a value obtained by a procedure described therefor in A.S.T.M. D–1457–56T. Reference hereinafter to "ratio of power number to discharge coefficient" in stirring is a value determined by a procedure of S. Nagato et al., Memoirs of the Faculty of Engineering, Kyoto University, vol. 22, page 68, January 1960. It is a measure of the effectiveness of the stirring in imparting flow without shearing.

It has been found in the course of research leading to the present invention that when tetrafluoroethylene is contacted with an aqueous solution containing a free radical initiator, the tetrafluoroethylene dissolves in the water and polymerizes to form tiny solid water-wet nuclei, and nuclei formation continues for only a limited time, after which any further polymerization results in an increase in the size of the existing nuclei, rather than formation of new nuclei. When the water-wet nuclei have sufficiently increased in size, they are coagulated by the agitation applied to the aqueous medium, to agglomerated non-water-wet particles, after which further polymerization takes place largely on the surface of the agglomerated non-water-wet particles at an increased rate, apparently via direct contact of gaseous monomer with the non-water-wet agglomerates, rather than by contact of dissolved monomer with water-wet particles. The more rapid polymerization rate thus makes it more economical to produce powders by techniques involving direct contact of the monomer with the non-water-wet aggregates, than to produce powders by dispersion techniques in which the difficultly soluble monomer must be dissolved in the medium before polymerization. There are however practical limits to this advantage, because the polymerization is highly exothermic, and as the reaction is accelerated it becomes increasingly difficult to remove the heat generated. For this reason it has hitherto been deemed desirable to carry out the preparation of granular powders in a violently agitated medium. The violent agitation however has the added inherent function of consolidating the solid nuclei after their formation so that further polymerization fills the interstices of the agglomerates, rapidly converting them into large, solid particles of low total surface area per gram. By contrast, in the processes of the present invention, the number of nuclei is made originally high and continues high during the further course of polymerization. In addition, in preferred aspects, the stirring is carried out at a controlled power input and at a high ratio of power number to discharge coefficient so as to minimize shear, thus making possible the preparation of high yield of polymer of high total surface area while maintaining high rates of polymerization.

The total number of nuclei in the reaction medium can be controlled in various ways. For the purposes of the present invention, concentration of nuclei in a reaction medium is taken as the value calculated from the total surface area of the solid product on the assumption that the nuclei are solid spherical particles of uniform size having a density of 2.28. On this basis, the total volume of solid is calculated from the total weight of solid and the assumed density; the surface area of the individual nuclei is calculated from the total volume and surface area of the solid; the number of individual nuclei is calculated from the total surface area and the surface area of the individual nucleus, and this number is compared with the volume of the aqueous medium in ml. to determine the number of nuclei per ml.

The number of nuclei in the aqueous medium can be controlled by seeding the medium with solid nuclei having a total surface area per gram of greater than 3 square meters and preferably greater than 9 square meters, before commencing polymerization in accordance with the process of the present invention. The solid nuclei may be composed of any material which is substantially insoluble in the reaction medium. Examples of materials which may be used as nuclei include glass, silica, carbon, and insoluble metal silicates and oxides such as titania, alumina, zirconia, and the like, as well as polymers and copolymers of highly fluorinated olefins such as tetrafluoroethylene, vinylidene fluoride, hexafluoropropylene, chlorotrifluoroethylene, perfluoropropyl perfluorovinyl ether, etc. For most ultimate uses however, polytetrafluoroethylene nuclei are preferred in order to take maximum advantage of the uniquely valuable combination of properties possessed by the unmodified polymer.

As indicated above, it is feasible to prepare the nuclei in a separate reaction, and charge these nuclei, either as a concentrated dispersion of water-wet nuclei or in the form of agglomerated non-water-wet particles, to the aqueous medium before commencing polymerization. When the nuclei are charged in water-wet form, they are converted to non-water-wet agglomerates in the aqueous medium either before or after commencing to polymerize tetrafluoroethylene in their presence.

In the preferred practice of the present invention however, the requisite number of polytetrafluoroethylene nuclei are prepared in situ in the aqueous medium in which they are to be further contacted with tetrafluoroethylene in accordance with other features of the present invention. The concentration of polytetrafluoroethylene nuclei formed when tetrafluoroethylene is dissolved in an aqueous medium containing a free radical initiator in the absence of preformed nuclei may be increased by increasing the concentration of tetrafluoroethylene in the medium; by increasing the concentration of free radicals in the medium; by including a water-soluble chain transfer agent, copolymerizable monomer, or telogenically inactive fluorinated dispersing agent in the medium; and by minimizing shear in stirring the medium.

In preferred aspects of the invention, tetrafluoroethylene is polymerized to form the requisite nuclei in an aqueous medium containing a free radical initiator in contact with tetrafluoroethylene at a pressure in the range of 10 to 50 atmospheres. At lower pressures it is difficult to form the requisite number of nuclei, and at higher pressures thick-walled vessels of poor heat transfer characteristics are necessary to contain the reaction. Pressures in the same range are also preferred in further polymerizing tetrafluoroethylene in contact with the aqueous medium containing the solid nuclei in agglomerated non-water-wet form, to achieve maximum polymerization rates consistent with heat transfer considerations. However pressures on either side of this range are operable.

It is additionally preferred to form said nuclei in an aqueous medium containing 20 to 200 weight parts inorganic persulfate, per million weight parts aqueous medium at a temperature in the range of 60° C. to 130° C. Advantageously, the same conditions are also used in further polymerization to form the final product. While any of a wide variety of other free radical initiators known to be effective for polymerizing tetrafluoroethylene can also be used, as for example redox systems, azo initiators, organic and inorganic peroxides and the like, the inorganic persulfates such as ammonium persulfate and potassium persulfate can effectively be used in the preferred range of temperature and pressures to generate the requisite number of nuclei and initiate further polymerization to obtain desired final products of high molecular weight at rapid rates, and are relatively inexpensive.

It is additionally preferred to include 50 to 500 weight parts telogenically inactive fluorinated dispersing agent in the aqueous medium in which the nuclei are formed. This amount of dispersing agent serves to facilitate formation of the requisite number of nuclei without interfering with the subsequent polymerization to form the final product. While water-soluble chain transfer agents such as hydrogen, organic compounds containing hydrogen or halogen other than fluorine, and copolymerizable monomers such as hexafluoropropylene, n-perfluoropropyl perfluorovinyl ether, vinylidene fluoride, and chlorotrifluoroethylene can also be used, these agents also function to lower the molecular weight of the polymer produced and to slow down the overall reaction rate and are therefore not ordinarily preferred. A wide number of telogenically inactive fluorinated dispersing agents are already well known in the art. At concentrations lower than this range the favorable effect on the number of nuclei is quite small, and at higher concentrations, no markedly increased benefit results.

It is yet further preferred to stir the medium at a power input in the range of 0.0004 to 0.002 kg.-m./sec./ml., and especially at a ratio of power number to discharge coefficient of at least 1.4 in preparing the requisite number of nuclei in agglomerated non-water-wet form. At lower power input rates, it is difficult to achieve adequate movement of the aqueous medium relative to the cooling walls of the polymerization vessel. At higher power input rates the shear inherently resulting in the aqueous medium reduces the total number of nuclei and adversely affects the moldability index of the polymer. The favorable effects of stirring under such controlled power are maximized by stirring in such a way as to achieve maximum flow rate at minimum shear. The highest ratio of power number to discharge coefficient is achieved through the use of a flat vertically disposed paddle stirrer, having a ratio of about 3.4. Any departure from this design tends to lower the ratio. At ratios below 1.3, the efficiency with which the desired products of the present invention can be produced is markedly impaired.

The invention is more specifically illustrated and explained by means of the following comparative and illustrative examples, which are not intended to be limiting. In the examples all parts are by weight except as noted. In each of the examples a solution containing 50 parts per million ammonium persulfate initiator and 5600 parts per million sodium tetraborate buffer in distilled water is employed as the aqueous medium. 500 parts of this medium are charged to a stirred autoclave having a capacity of 700 parts. Stirring is then commenced and the charge is heated to the desired reaction temperature. The free space above the charge is then thrice evacuated and purged with tetrafluoroethylene, after which the charge is pressured with tetrafluoroethylene and reacted at the indicated temperature, pressure and stirring rate until the indicated content of solids is produced.

At the conclusion of each run the pressure is released, and the aqueous slurry containing the product in the form of rough stringy particles is discharged. The solids are filtered from the slurry, and a 475 gram sample dispersed in 3100 ml. water is water-cut for 25 seconds with a bladed stirrer rotating at 13,000 r.p.m. The water-cut slurry is then stirred for 2 hours in a 4-liter baffled steel beaker with just sufficient agitation to keep the non-water-wet particles submerged. The solids are then filtered off, dried 16 hours at 120° C., and characterized by the tests indicated. In the polymerizations, the different agitators employed were a vertically disposed flat paddle, having a ratio of power number to discharge coefficient of 3.4; a stirrer with flat blades pitched at an angle of 15 degrees to the horizontal, having a said ratio of 1.45; a gas turbine having a said ratio of 1.65; a marine propeller having a said ratio of 1.60, and a bladed propeller having horizontal shear tips, having a said ratio of 1.3. The tensile strengths and elongations recited are values obtained by the procedures therefor described in A.S.T.M. D-1457-56T. In each of the illustrative examples the reaction proceeded initially at a slow rate, and then markedly increased in rate as the production of the non-water-wet agglomerates occurred. In each of the illustrative examples, the total number of nuclei present is above $5 \times 10^{10}$ per ml. The overall reaction time in each of Examples III to X is in the range of 20 to 40 minutes, and in Examples I and II is in the range of 5 to 10 minutes.

Example I

The reaction temperature is 80° C., the pressure is 27 atmospheres of tetrafluoroethylene gas, the power applied in stirring is 0.001 kg.-m./sec./ml., the ratio of power number to discharge coefficient in stirring is 1.60, and the reaction is continued to produce 12 percent solids based on the weight of the aqueous medium. After cutting, washing and drying, the product has a total surface area per gram of 7.1 square meters, a standard specific gravity of 2.191, a moldability index of 1, an apparent density of 420 g./liter, a tensile strength of 2820 lbs./sq. inch, and an elongation at break of 327%.

Example II

The procedure of Example I is repeated except that the reaction is continued to produce 18 percent solids, based on the weight of the aqueous medium. After cutting, washing and drying, the product has a total surface area per gram of 4.2 square meters, a standard specific gravity of 2.173, a moldability index of 3, an apparent density of 500 g./liters a tensile strength of 4130 lb./sq. in. and an elongation at break of 340 percent.

In a comparative example in which the total number of nuclei is less than $5 \times 10^{10}$/ml., and in which the reaction temperature is 65° C., the reaction pressure is 13 atmospheres, the power applied in stirring is 0.001 kg.-m./sec./ml., the ratio of power number to discharge coefficient in stirring is 1.3, and the reaction is continued to produce 30 weight percent solids based on the weight of the aqueous medium, the product after cutting, washing and drying has a total surface area per gram of 1.43 square meters, a standard specific gravity of 2.150, a moldability index of 50, an apparent density of 550 g./liter, a tensile strength of 2300 lb./sq. in., and an elongation at break of 180 percent. Further treating the product by the procedure of U.S. Patent 2,936,301 lowers the moldability index, but at the same time also lowers the apparent density of the powder to below 330 g./liter.

Example III

The reaction temperature is 65° C., the pressure is 20 atmospheres, the power applied in stirring is 0.001 kg.-m./sec./ml., the ratio of power number to discharge coefficient in stirring is 3.4, 200 parts ammonium 3,6-dioxa-2,5-bis-(trifluoromethyl)-undecafluorononanoate per million weight parts of water is included in the aqueous medium before commencing the polymerization, and the reaction is continued to produce 24 percent solids based on the weight of the aqueous medium. The product after cutting, washing and drying has a total surface area per gram of 5.13 square meters, a standard specific gravity of 2.169, a moldability index of 20, an apparent density of 590 g./liter, a tensile strength of 3290 lb./sq. in. and an elongation at break of 288 percent.

Example IV

The procedure of Example III is repeated except that the dispersing agent is 200 parts ammonium salt of ammonium omega hydrohexadecafluorononanoate per million weight parts of water. The product has a total surface area per gram of 4.81 square meters, a standard specific gravity of 2.171, a moldability index of 18, an apparent density of 587 g./liter, a tensile strength of 3660 lb./sq. in., and an elongation at break of 315%.

Example V

The procedure of Example IV is repeated except that the dispersing agent is 200 parts of ammonium perfluorooctanoate per million weight parts of water. The product has a total surface area per gram of 4.01 square meters, a standard specific gravity of 2.173, a moldability index of 22, an apparent density of 685 g./liter, a tensile strength of 3250 lb./sq. in., and an elongation at break of 282%.

Example VI

The reaction temperature is 65° C., the reaction pressure is 15 atmospheres, the power applied in stirring is 0.0014 kg.-m./sec./ml., the ratio of power number to discharge coefficient in stirring is 3.4, 300 parts of ammonium perfluorooctanoate per million parts of water is included in the aqueous medium, and the reaction is continued to produce 30 percent solids by weight of the aqueous medium. The product, after cutting, washing and drying, has a total surface area per gram of 5.30, a standard specific gravity of 2.164, a moldability index of 15, an apparent density of 565 g./liter, a tensile strength of 3960 lb./sq. in., and an elongation at break of 318%.

Example VII

The procedure of Example VI is repeated except that the ratio of power number to discharge coefficient in stirring is 1.65. The product after cutting, washing and drying has a total surface area per gram of 4.95 square meters, a standard specific gravity of 2.168, a moldability index of 20, an apparent density of 591 g./liter, a tensile strength of 3660 lb./sq. in., and an elongation at break of 290%.

Example VIII

The procedure of Example VII is repeated except that the ratio of power number to discharge coefficient in stirring is 1.45. The results are substantially the same except that the total surface area per gram is 4.14 square meters.

Example IX

The procedure of Example VIII is repeated except that the ratio of power number to discharge coefficient in stiring is 1.3. The product after cutting, washing and drying has a total surface area per gram of 3.22 square meters, the standard specific gravity is 2.163, the moldability index is 37, the apparent density is 672 g./liter, the tensile strength is 3270 lb./sq. in. and the elongation at break 279%.

Example X

The procedure of Example VI is repeated except that the power applied to the medium in stirring is 0.004 kg.-m./sec./ml. The product, after cutting, washing and drying, has a total surface area per gram of 3.12 square meters, a standard specific gravity of 2.152, a moldability index of 30, an apparent density of 608 g./liter, a tensile strength of 2900 lb./sq. in., and an elongation at break of 250%.

It will be apparent from the foregoing examples that in the specially prefered aspects of the present invention there are obtained novel polytetrafluoroethylene molding powders having a total surface area per gram in the range of 4 to 7 square meters, a moldability index of less than 25, an apparent density of 400 to 700 g./liter and a standard specific gravity of less than 2.2 By reason of their high apparent density, these specially prefered products can be processed in automatic molding machines, and additionally, by reason of their low moldability index they can be readily preformed and free-sintered to yield integral articles having very low void content and excellent dielectric strength. In addition it will be apparent from the foregoing examples that the specially preferred processes of the present invention can be used to prepare these products economically, without resort to expensive post-treatments to improve moldability.

We claim:

1. A process for preparing polytetrafluoroethylene molding powder which comprises polymerizing tetrafluoroethylene in contact with a stirred aqueous medium containing a free radical initiator and solid nuclei in the form of agglomerated non-water-wet particles having a total surface area per gram of greater than 3 square meters characterized in that the power applied to said medium in stirring is in the range of 0.0004 to 0.002 kg.-m./sec./ml., said medium contains at least $5 \times 10^{10}$ nuclei per milliter, polymerization is contained at a temperature in the range of 60° C. to 130° C., and a pressure in the range of 10 to 50 atmospheres, until the particles have a reduced total surface area per gram of less than 9 square meters, and polymerization is discontinued before the total surface area of the particles per gram falls below 3 square meters.

2. A process according to claim 1 wherein the ratio of power number to discharge coefficient in stirring is at least 1.4.

3. A process according to claim 2 which comprises polymerizing tetrafluoroethylene to form said nuclei in an aqueous medium containing 20 to 200 weight parts inorganic persulfate per million weight parts aqueous medium.

4. A process according to claim 3 which comprises polymerizing tetrafluoroethylene to form said nuclei in an aqueous medium containing 50 to 500 weight parts telogenically inactive fluorinated dispersing agent per million weight parts aqueous medium.

5. Polytetrafluoroethylene molding powder made by the process of claim 1 having a total surface area per gram of at least 3 and less than 9 square meters per gram, a standard specific gravity of less than 2.2, a moldability index of less than 50, and an apparent density of at least 400 g./liter.

6. Polytetrafluoroethylene molding powder having a total surface area per gram in the range of 4 to 7 square meters, a moldability index of less than 25, an apparent density in the range of 400 to 700 g./liter, and a standard specific gravity of less than 2.2.

References Cited by the Examiner
UNITED STATES PATENTS

| | | | |
|---|---|---|---|
| 2,456,621 | 12/1948 | Cheney | 260—92.1 |
| 2,559,752 | 7/1951 | Berry | 260—92.1 |
| 3,010,950 | 11/1961 | Thomas | 260—92.1 |
| 3,087,921 | 4/1963 | Matthews et al. | 260—92.1 |
| 3,088,941 | 5/1963 | Uhland | 260—92.1 |

JOSEPH L. SCHOFER, *Primary Examiner.*

WILLIAM H. SHORT, *Examiner.*

J. F. McNALLY, *Assistant Examiner.*